United States Patent
Kaminaga et al.

(10) Patent No.: US 7,106,184 B2
(45) Date of Patent: Sep. 12, 2006

(54) REAR ENTERTAINMENT SYSTEM AND CONTROL METHOD THEREOF

(75) Inventors: Satoshi Kaminaga, Saitama (JP); Takao Inoue, Saitama (JP)

(73) Assignee: Pioneer Corporation, Tokyo (JP)

( * ) Notice: Subject to any disclaimer, the term of this patent is extended or adjusted under 35 U.S.C. 154(b) by 290 days.

(21) Appl. No.: 10/298,510

(22) Filed: Nov. 19, 2002

(65) Prior Publication Data
US 2003/0095179 A1    May 22, 2003

(30) Foreign Application Priority Data
Nov. 22, 2001 (JP) ............. P. 2001-357254

(51) Int. Cl.
*B60Q 1/00* (2006.01)
(52) U.S. Cl. ............. 340/438; 340/461; 340/444; 340/985; 701/29; 701/34; 701/39
(58) Field of Classification Search ............. 340/438, 340/461, 444, 426.15, 985, 988, 990, 995.1, 340/995.17; 701/211, 207, 208, 213, 29, 701/34, 39
See application file for complete search history.

(56) References Cited

U.S. PATENT DOCUMENTS

| | | | | |
|---|---|---|---|---|
| 5,521,580 A | * | 5/1996 | Kaneko et al. | 340/439 |
| 5,610,822 A | * | 3/1997 | Murphy | 701/211 |
| 5,635,925 A | * | 6/1997 | Kishi et al. | 340/996 |
| 5,764,139 A | * | 6/1998 | Nojima et al. | 340/461 |
| 5,935,193 A | * | 8/1999 | Saiki | 701/211 |
| 5,964,821 A | * | 10/1999 | Brunts et al. | 701/201 |
| 6,243,645 B1 | * | 6/2001 | Moteki et al. | 701/211 |
| 6,446,001 B1 | * | 9/2002 | Sakai et al. | 701/211 |
| 6,529,825 B1 | * | 3/2003 | Nagasaka et al. | 701/211 |
| 6,795,757 B1 | * | 9/2004 | Sadahiro | 701/29 |
| 2003/0007227 A1 | * | 1/2003 | Ogino | 359/227 |

* cited by examiner

Primary Examiner—Tai T. Nguyen
(74) Attorney, Agent, or Firm—Drinker Biddle & Reath LLP (57) ABSTRACT

A rear entertainment system has a voice synthesis circuit, an OSD unit, a video camera, a DVD playback unit, a rear monitor, a navigation unit, a mixer, an IR circuit, and headphones. The voice synthesis circuit and the OSD unit receive driving information from a handle, a brake, a winker, and so on. The voice synthesis circuit presents the driving condition in an audio form, while the OSD unit presents the driving condition in a video form. The video camera takes a scene in a forward direction. The navigation unit supports the driving of the vehicle. The mixer synthesizes the voice output of the voice synthesis circuit, audio signals from the DVD playback unit and audio signals from the navigation unit. The IR circuit converts the synthesized audio signals into IR signals. The headphones receive the IR signals from the IR circuit and convert the IR signals into audio.

15 Claims, 7 Drawing Sheets

REAR ENTERTAINMENT SYSTEM AND CONTROL METHOD THEREOF

The present disclosure relates to the subject matter contained in Japanese Patent Application No. 2001-357254 filed on Nov. 22, 2001, which are incorporated herein by reference in its entirety.

BACKGROUND OF THE INVENTION

1. Field of the Invention

The present invention relates to a technical field of a rear entertainment system and a control method thereof enabling a fellow passenger other than a driver in a movable body such as a vehicle, for example, a fellow passenger sitting in a rear seat to be entertained with video or music.

2. Description of the Related Art

In the related art, such a rear entertainment system is disposed independently of a navigation screen disposed at a driver's seat or a front seat, and designed so that movies or news can be watched or listened to in a rear seat through a rear seat monitor. Particularly, audio is typically listened to with headphones so as not to be disturbed by noise including the driving noise of the vehicle or music for the front seat.

However, according to this system, when the vehicle turns or slows down, the audience cannot anticipate such an operation so that the audience cannot take a safe posture. Further, this invites motion sickness.

To cope with this problem, for example, technically, a navigation screen similar to that displayed on the driver's seat monitor can be displayed in the rear seat monitor. However, the navigation screen does not match the intended purpose of the rear entertainment.

SUMMARY OF THE INVENTION

The invention was therefore developed taking the foregoing problems into consideration. An object of the invention is to provide a rear entertainment system and a control method thereof in which various video information or audio information can be output so as to ensure safety and reduce motion sickness.

In order to solve the problems, a first rear entertainment system according to the invention is a rear entertainment system mounted on a rear seat of a vehicle, having an output unit for outputting contents information including at least one of audio information and image information and a first control unit for controlling the output unit in accordance with driving information indicating driving condition of the vehicle so that the driving information is output directly or as audio or an image corresponding to the driving information in place of or in addition to the contents information, when the driving condition is in predetermined kinds of conditions.

The first rear entertainment system according to the invention has a unit for outputting contents information such as music or video software or game software. Examples of such units include a CD player for music software, a DVD player or a video player for video software, and a CD-ROM playback unit for game software. A reproduced signal from any one of such units is supplied to an audio output unit or a display unit set at the rear seat. On the other hand, when driving information showing the driving condition of the vehicle is in the predetermined kinds of conditions, control is made as follows. That is, the driving information is supplied to the display at the rear seat, headphones or the like, directly or as audio or an image corresponding to the driving information in place of or in addition to the contents information. Thus, the fellow passenger in the rear seat can know the driving information so that the fellow passenger can take a posture capable of dealing with the anticipated condition of the vehicle beforehand. Thus, motion sickness or the like can be prevented from occurring.

In order to solve the problems, a second rear entertainment system according to the invention is a rear entertainment system mounted on a rear seat of a vehicle, having an output unit for outputting contents information including at least one of audio information and image information and a control unit for controlling the output unit so that navigation information supplied from a navigation unit for carrying out navigation is output directly or as audio or an image corresponding to the navigation information in place of or in addition to the contents information.

The second rear entertainment system according to the invention has a unit for outputting contents information such as music or video software or game software. Examples of such units include a CD player for music software, a DVD player or a video player for video software, and a CD-ROM playback unit for game software. A reproduced signal from any one of such units is supplied to an audio output unit or a display unit set at the rear seat. On the other hand, a navigation unit for performing the navigation of the vehicle is provided. Control is made so that navigation information output from the navigation unit is supplied to the display at the rear seat, headphones or the like, directly or as audio or an image corresponding to the navigation information in place of or in addition on the contents information. Thus, the fellow passenger in the rear seat can know the navigation information so that the fellow passenger can take a posture capable of dealing with the anticipated condition of the vehicle beforehand. Thus, motion sickness or the like can be prevented from occurring.

In order to solve the problems, a third rear entertainment system according to the invention further has a second control unit for controlling the output unit so that navigation information supplied from a navigation unit for carrying out navigation is output directly or as audio or an image corresponding to the navigation information in place of or in addition to the contents information.

The third rear entertainment system according to the invention has a unit for outputting contents information such as music or video software or game software. Examples of such units include a CD player for music software, a DVD player or a video player for video software, and a CD-ROM playback unit for game software. A reproduced signal from any one of such units is supplied to an audio output unit or a display unit set at the rear seat. Further, when driving information showing the driving condition of the vehicle belongs to a predetermined kinds of conditions, control is made as follows. That is, the driving information is supplied to the display at the rear seat, headphones or the like, directly or as audio or an image corresponding to the driving information in place of or in addition on the contents information. Further, a navigation unit for the navigation of the vehicle is provided. Control is made so that navigation information output from the navigation unit is supplied to the display at the rear seat, headphones or the like, directly or as audio or an image corresponding to the navigation information in place of or in addition on the contents information. Thus, the fellow passenger in the rear seat can know the driving information of the vehicle or the navigation information of the vehicle so that the fellow passenger can take a posture capable of dealing with the anticipated condition of the vehicle beforehand. Thus, motion sickness or the like can be prevented from occurring.

In a configuration of the first, second or third rear entertainment system according to the invention, the first control unit controls the output unit so as to convert at least one of the driving information and the navigation information into audio or an image corresponding thereto in accordance with a predetermined conversion rule and output the audio or the image in place of or in addition to the contents information.

With this configuration, by the first control unit, the driving information or the navigation information is converted into audio or an image corresponding thereto, and then supplied in place of or in addition on the contents information. Accordingly, the driving information or the navigation information formed in a more preferable form (for example, audio or an image not spoiling the atmosphere, or audio or an image easy to understand audiovisually) for the fellow passenger in the rear seat as an audience of the contents information can be presented. Incidentally, the configuration of the system can be simplified when the driving information or the navigation information is supplied to the display or the headphones in place of or in addition on the contents information directly or as it is (for example, the tone of a winker is supplied as it is).

In another configuration of the first, second or third rear entertainment system according to the invention, at least one of the driving information and the navigation information is made of synthetic voice information.

With this configuration, the driving information or the navigation information is supplied to the headphones or the like for the rear seat, as synthetic voice information showing the driving condition or the navigation. In this case, if the driving information or the navigation information supplied to the system is synthetic voice information, the synthetic voice information may be supplied directly. If the driving information or the navigation information supplied to the system is not synthetic voice information, the driving information or the navigation information may be converted into synthetic voice information. Thus, the synthetic voice information is supplied after the conversion.

In a further configuration of the first, second or third rear entertainment system according to the invention, the driving condition includes at least one of brake operating condition of the vehicle and winker blinking condition of the vehicle.

With this configuration, at least a brake operating signal and winker signals designating right turn and left turn are used as signals showing the condition the vehicle is going to take. By dealing with such signals, the fellow passenger in the rear seat can take a posture against the motion of stop, right turn or left turn of the vehicle before the vehicle makes the motion.

In a still further configuration of the first, second or third rear entertainment system according to the invention, the driving information is made of a tone of a winker.

With this configuration, the tone of a winker is used as the driving information of the vehicle. At this time, the tone of the winker may be output from the output unit directly as the driving information. Alternatively, by use of the tone of the winker as the driving information, it may be judged whether the driving condition belongs to a predetermined category (that is, left turn or right turn). In this case, the output unit is designed to output driving information (for example, a synthetic voice "going to turn left") other than the tone of the winker in accordance with the judgement result.

In another configuration of the first, second or third rear entertainment system according to the invention, the rear entertainment system further has a unit for switching a screen of the output unit to a navigation screen.

With this configuration, the fellow passenger in the rear seat can select to display, on the rear monitor, the same screen as the display screen of the navigation unit. Thus, the fellow passenger in the rear seat can obtain the same navigation information as that for the driver. This is implemented by a selection key provided in an appropriate portion in the periphery of the rear monitor.

In a further configuration of the first, second or third rear entertainment system according to the invention, the contents information is paused, a screen of the output unit is switched to another screen displaying at least one of the driving information and the navigation information, and the screen is then switched again so as to be restored to the contents information.

With this configuration, the contents which are being reproduced can be paused temporarily. Then, the contents are once switched to the driving information and/or the navigation information so as to confirm the motion of the vehicle. After that, the contents can be reproduced again from the pause position.

In a still further configuration of the first, second or third rear entertainment system according to the invention, a screen of the output unit is switched to a scenic video image through a camera taking an image of a scene outside the vehicle.

With this configuration, a video image of a scene outside the vehicle taken by a camera mounted on the vehicle, for example, a video image of a forward scene taken by the camera is displayed on the rear monitor. Thus, the fellow passenger in the rear seat can take a posture corresponding to the motion of the vehicle while obtaining the behavior of the vehicle as visual information. Accordingly, the fellow passenger can deal with the motion of the vehicle more suitably.

In anther configuration of the first, second or third rear entertainment system according to the invention, the contents information and at least one of the driving information and the navigation information are output from headphones.

With this configuration, the contents information and the audio information of the driving information and/or the navigation information are listened to with headphones. Thus, the fellow passenger can listen to such information without being annoyed with in vehicle noise including music for the front seat. In addition, a transmitting unit using infrared light or a transmitting unit using faint radio waves can be used for transmitting information to the headphones.

In a further configuration of the first, second or third rear entertainment system according to the invention, another video image displaying at least one of the driving information and the navigation information is selectively displayed on one-half of a screen of the output unit.

With this configuration, the contents information is displayed on one-half of the screen while the driving information and/or the navigation information are displayed on the other half of the screen.

In a still further configuration of the first, second or third rear entertainment system according to the invention, another video image displaying at least one of the driving information and the navigation information is superimposed on a part of a screen of the output unit.

With this configuration, the driving information and/or the navigation information are displayed together with the contents information so as to overlap the contents information on a predetermined portion of the screen.

In another configuration of the first, second or third rear entertainment system according to the invention, an output of at least one of the driving information and the navigation information can be turned ON/OFF.

With this configuration, when the fellow passenger in the rear seat does not need the driving information or the navigation information, the fellow passenger can choose not to display such information on the rear monitor. Accordingly, the contents information can be reproduced without any interference. This is implemented by an operating key provided in an appropriate portion in the periphery of the rear monitor or an operating key provided in the headphones.

In order to solve the problems, according to the invention, there is provided a first control method of a rear entertainment system mounted on a rear seat of a vehicle, the method having the steps of outputting contents information including at least one of audio information and image information and controlling the output step in accordance with driving information indicating driving condition of the vehicle so that the driving information is output directly or as audio or an image corresponding to the driving information in place of or in addition to the contents information, when the driving condition is in predetermined kinds of conditions.

The first rear entertainment control method according to the invention has the step of outputting contents information such as music or video software or game software, and the control step of making control to output driving information to a display, headphones or the like, directly or as audio or an image corresponding to the driving information. Such information is controlled to be supplied, in a predetermined method, to an audio output unit or a display unit set at the rear seat.

In order to solve the problems, according to the invention, there is provided a second control method of a rear entertainment system mounted on a rear seat of a vehicle, the method having the steps of outputting contents information including at least one of audio information and image information and controlling the output step so that navigation information supplied from a navigation unit for carrying out navigation is output directly or as audio or an image corresponding to the navigation information in place of or in addition to the contents information.

The second rear entertainment control method of the invention has the step of outputting contents information such as music or video software or game software, and the control step of making control to output navigation information supplied from a navigation unit for performing navigation to a display, headphones or the like, directly or as audio or an image corresponding to the navigation information. Such information is controlled to be supplied, in a predetermined method, to an audio output unit or a display unit set at the rear seat.

In order to solve the problems, according to the invention, there is provided a third control method of a rear entertainment system mounted on a rear seat of a vehicle, the method further having the steps of controlling the output step so that navigation information supplied from a navigation unit for carrying out navigation is output directly or as audio or an image corresponding to the navigation information in place of or in addition to the contents information.

The third rear entertainment control method according to the invention has the step of outputting contents information such as music or video software or game software, the control step of making control to output driving information to a display, headphones or the like, directly or as audio or an image corresponding to the driving information, and the control step of making control to output navigation information supplied from a navigation unit for performing navigation to a display, headphones or the like, directly or as audio or an image corresponding to the navigation information. Such information is controlled to be supplied, in a predetermined method, to an audio output unit or a display unit set at the rear seat.

The operation and other gains of the invention will be made clear from its embodiments which will described next.

DETAILED DESCRIPTION OF THE PREFERRED EMBODIMENTS

Embodiments of the invention will be described below with reference to the drawings.

First Embodiment

Figure 1:
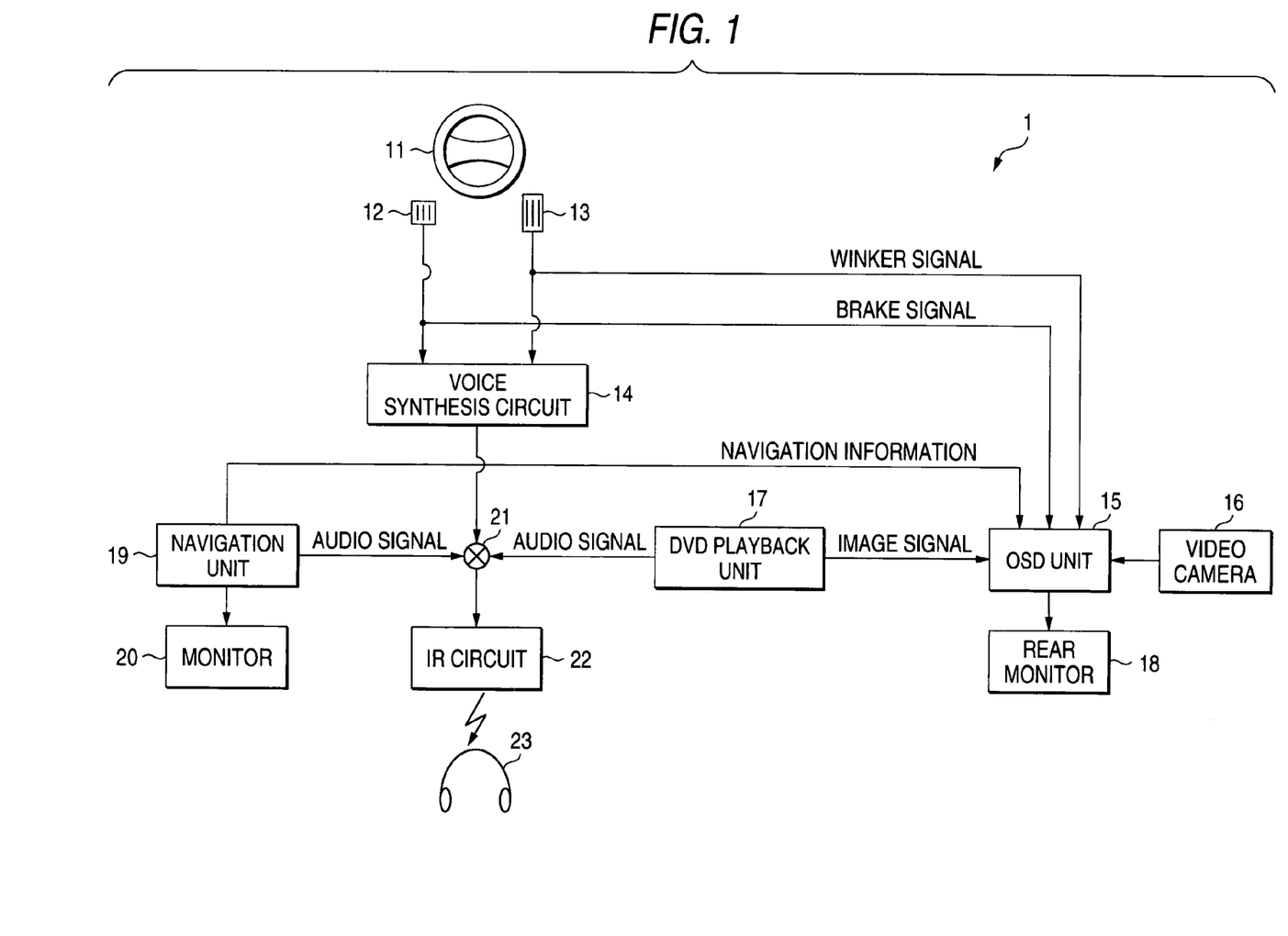
FIG. 1 is a block diagram showing the configuration of a rear entertainment system according to a first embodiment of the invention.
Figure 2:
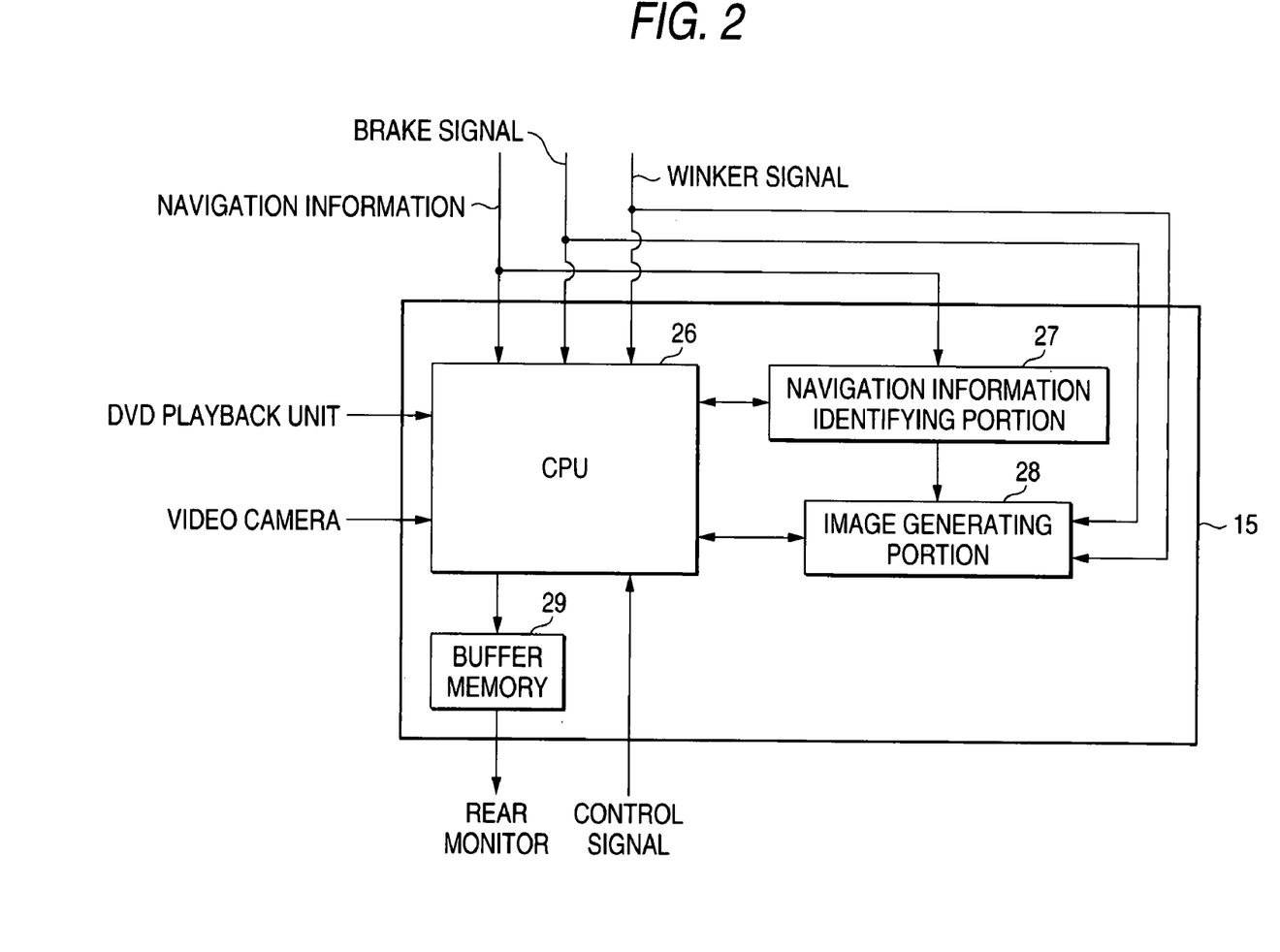
FIG. 2 is a block diagram showing the configuration of an OSD unit applied to the first embodiment.
Figure 3:
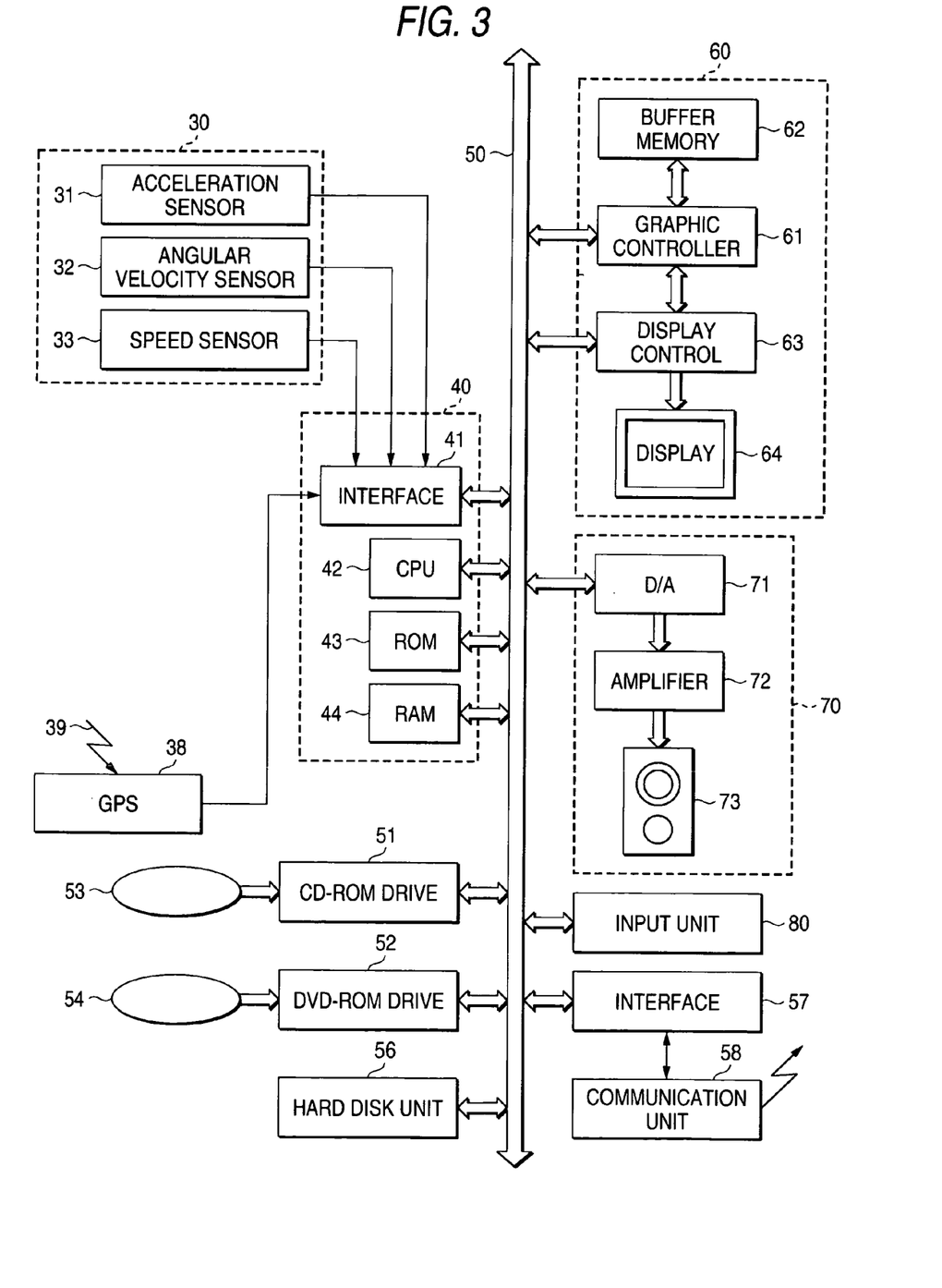
FIG. 3 is a block diagram showing an example of the configuration of a navigation unit introduced into the configuration of the rear entertainment system according to the invention.
Figure 4:
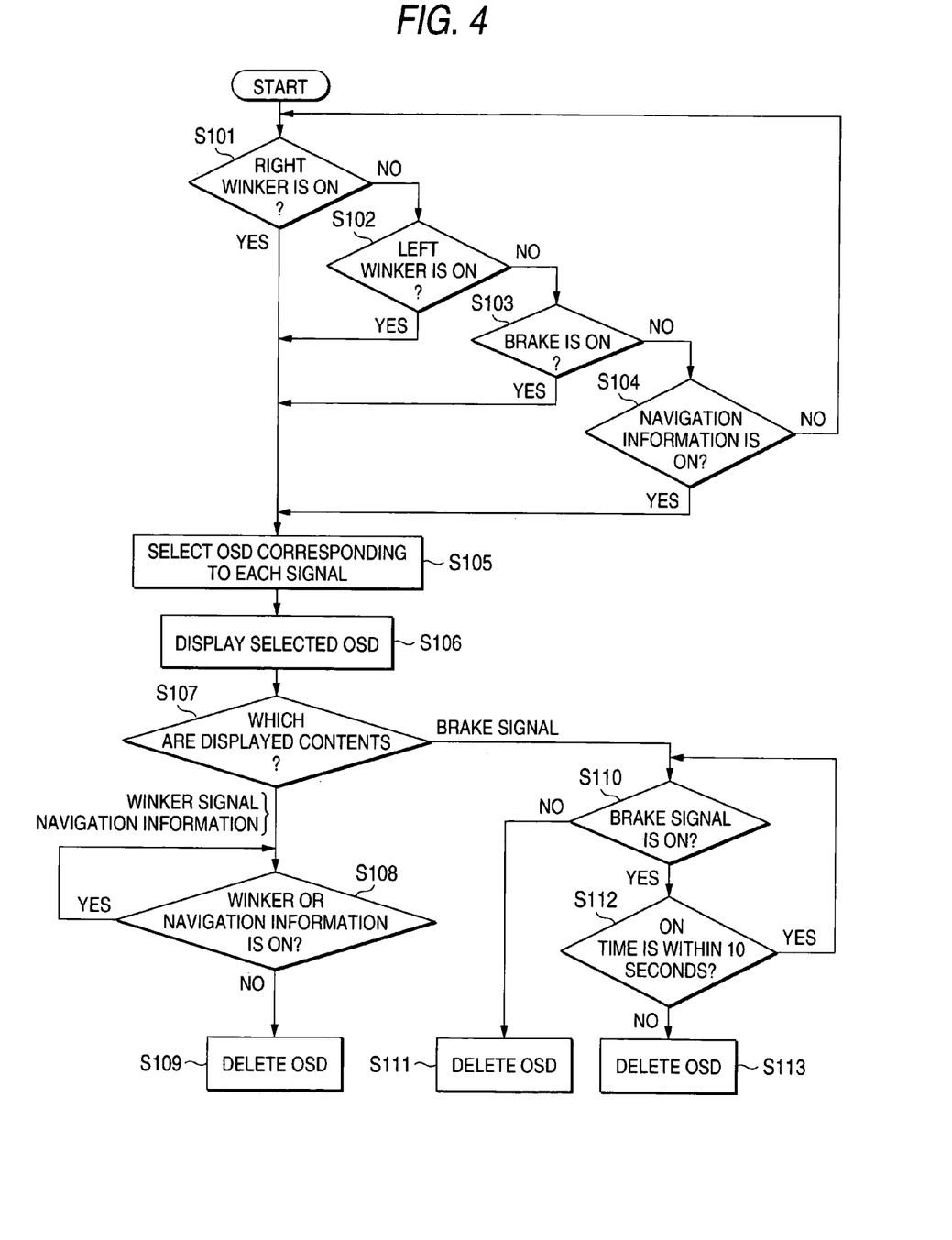
FIG. 4 is a flow chart showing the flow of the operation of the rear entertainment system according to the invention.
Figure 5:
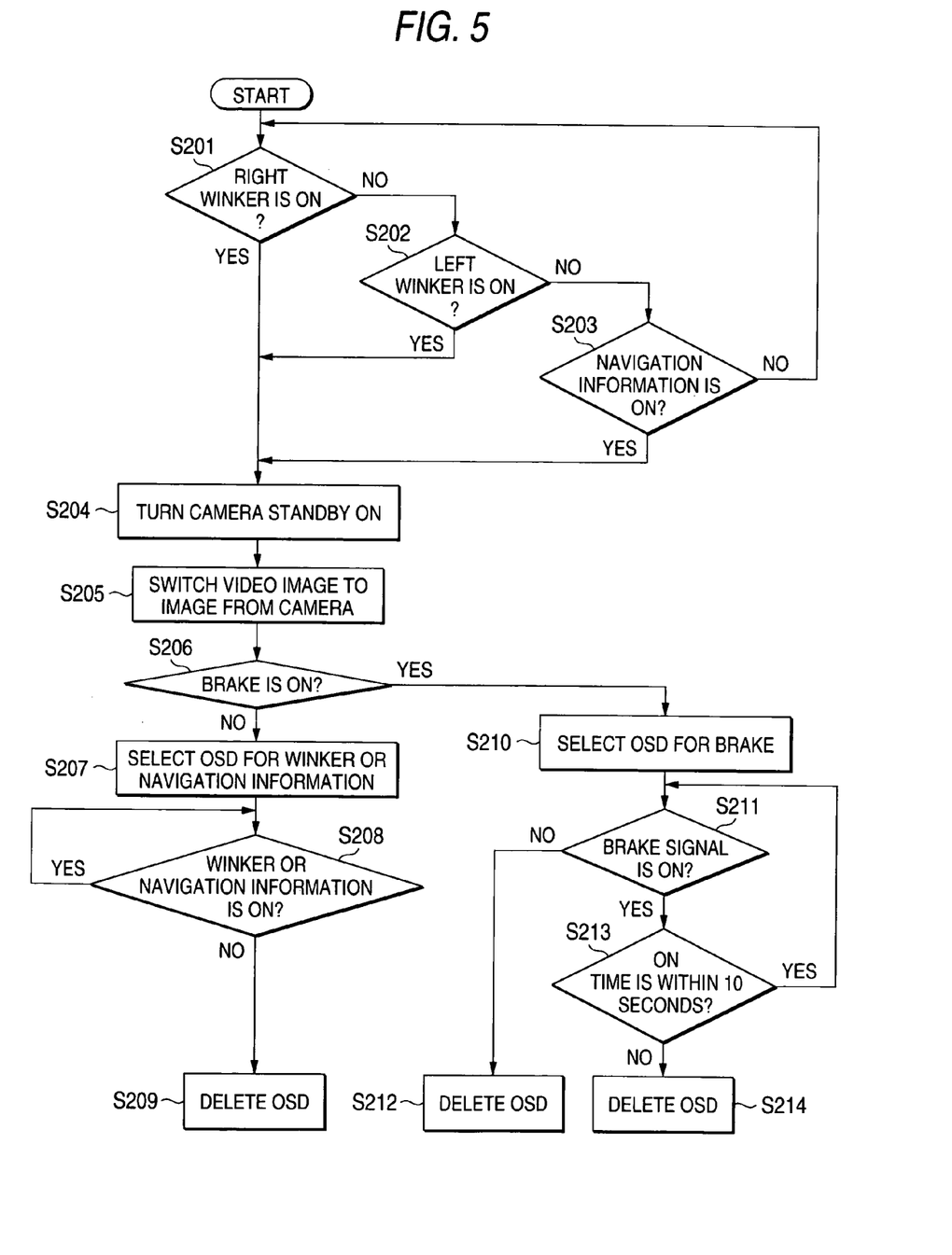
FIG. 5 is a flow chart showing the flow of the operation of the rear entertainment system according to the invention.

First, the first embodiment will be described with reference to FIGS. 1 to 5. Here, FIG. 1 is a block diagram showing the configuration of a rear entertainment system according to the first embodiment of the invention. FIG. 2 is a block diagram showing the configuration of an OSD unit applied to this embodiment. FIG. 3 is a block diagram showing an example of the configuration of a navigation unit introduced into the configuration of the rear entertainment system according to the invention. FIGS. 4 and 5 are flow charts showing the flow of the operation of the rear entertainment system according to the invention.

The configuration of a rear entertainment system 1 is shown in FIG. 1. As shown in FIG. 1, the rear entertainment system 1 has a voice synthesis circuit 14, an OSD (On Screen Display) unit 15, a video camera 16, a DVD (Digital Video Disc) playback unit 17, a rear monitor 18, a navigation unit 19, a monitor 20, a mixer 21, an IR (InfRared) circuit 22, and headphones 23. The voice synthesis circuit 14 and the OSD unit 15 receive driving information from a handle 11, a brake 12, a winker 13 and so on which are constituent parts for operating the vehicle. The voice synthesis circuit 14 presents the driving condition in an audio form to a fellow passenger sitting in a rear seat, while the OSD unit 15 presents the driving condition in a video form to the fellow passenger. The video camera 16 takes a scene in a forward direction. The DVD playback unit 17 runs DVD software. The rear monitor 18 is installed for the rear seat. The navigation unit 19 supports the driving of the vehicle.

The monitor 20 is installed on the driver's seat side for displaying video signals from the navigation unit 19. The mixer 21 synthesizes the voice output of the voice synthesis circuit 14, audio signals from the DVD playback unit 17 and audio signals from the navigation unit 19. The IR circuit 22 converts the synthesized audio signals into IR signals. The headphones 23 receive the IR signals from the IR circuit 22 and convert the IR signals into audio.

The configuration of the OSD unit 15 is shown in FIG. 2. As shown in FIG. 2, the OSD unit 15 has a CPU 26, a navigation information identifying portion 27, an image generating portion 28, and a buffer memory 29, by way of example. A brake signal, a winker signal, navigation information, a photographic signal from the video camera 16, and a reproduced signal from the DVD playback unit 17 are supplied to the OSD unit 15, while a video signal is supplied from the OSD unit 15 to the rear monitor 18 as an output signal.

The rear entertainment system according to the invention may be constituted by only a system involving audio or only a system involving video.

Next, description will be made on the configuration of the navigation unit 19. As shown in FIG. 3, the navigation unit has an independently position-measuring unit 30, a GPS receiver unit 38, a system controller 40, a CD-ROM drive 51, a DVD-ROM drive 52, a hard disk unit 56, a communication interface 57, a communication unit 58, a display unit 60, an audio output unit 70, an input unit 80, and so on.

The independently position-measuring unit 30 includes an acceleration sensor 31, an angular velocity sensor 32 and a speed sensor 33 so as to detect the acceleration, the angular velocity and the speed of the vehicle.

The GPS receiver unit 38 is used for detecting the absolute position of the vehicle from latitude and longitude information, and so on. The GPS receiver unit 38 receives radio waves 39 including position-measuring data from a plurality of GPS satellites. The GPS receiver unit 38 is used to know the current position of the vehicle as well as the independently position-measuring unit 30.

The system controller 40 includes an interface 41, a CPU 42, an ROM 43 and an RAM 44 so as to control the system as a whole.

The interface 41 carries out interface operation with the acceleration sensor 31, the angular velocity sensor 32, the speed sensor 33 and the GPS receiver unit 38. Speed data, acceleration data, angular velocity data, relative azimuth data, GPS position-measuring data, absolute azimuth data, ambient image data, and so on, are supplied from these sensors 31 to 33 and the unit 38 to the system controller 40 through the interface 41.

The CPU 42 controls the system controller 40 as a whole while having a function to judge, create and present information to be presented to the driver on the basis of various data supplied.

The ROM 43 has a not-shown nonvolatile memory or the like storing control programs for controlling the system controller 40, and so on. The RAM 44 stores various data in a readable form such as route data set in advance through the input unit 80 by the user, and provides a working area for the CPU 42.

The system controller 40, the CD-ROM drive 51, the DVD-ROM drive 52, the hard disk unit 56, the communication interface 57, the display unit 60, the audio output unit 70 and the input unit 80 are connected to one another through a bus line 50.

Under the control of the system controller 40, the CD-ROM drive 51 and the DVD-ROM drive 52 read various data such as road data and a control program corresponding to the unit operation from a CD-ROM 53 and a DVD-ROM 54, and output the read data and control program. The CD-ROM drive 53 and the DVD-ROM drive 54 may have a function to read audio data or video data as contents information from the CD-ROM 53 and the DVD-ROM 54.

The hard disk unit 56 stores, for example, map data read from the CD-ROM drive 51 or the DVD-ROM drive 52, the map date corresponding to the vehicle running position information measured by the GPS unit 38 or the like, and the audio or video data read from the CD-ROM drive 51 or the DVD-ROM drive 52 as contents information.

The communication unit 58 is, for example, constituted by a cellular phone, and designed to have a function capable of downloading audio or video data, map data, or predetermined sorts of data associated therewith through the communication interface 57 constituting a modem or the like.

The display unit 60 displays the various display data under the control of the system controller 40. The display unit 60 has a graphic controller 61, a buffer memory 62, a display control portion 63 and a display 64. The graphic controller 61 controls the display unit 60 as a whole on the basis of control data sent from the CPU 42 through the bus line 50. The buffer memory 62 stores image information temporarily. The display control portion 63 makes display control of the display 64 on the basis of the image data output from the graphic controller 61. The display 64 corresponds to the monitor 20 shown in FIG. 1.

The audio output unit 70 has a D/A (Digital to Analog) converter 71, an amplifier 72 and a speaker 73. Under the control of the system controller 40, the D/A converter 71 carries out D/A conversion of audio digital data sent from the CD-ROM drive 51, the DVD-ROM drive 52, the RAM 44, or the like, through the bus line 50. The amplifier 72 amplifies audio analog signals supplied from the D/A converter 71. The speaker 73 converts the amplified analog signals into audio and outputs the audio to the vehicle interior.

The input unit 80 is constituted by keys, switches, buttons, a remote controller, a voice input unit, and so on, for inputting various commands or data.

Next, description will be made on the operation of the rear entertainment system 1.

The driver drives the vehicle by free use of the vehicle operating units such as the handle 11, the brake 12 and the winker 13 and with the support as to the driving from the navigation unit 19.

The fellow passenger sitting in the rear seat appreciates the software reproduced by the DVD playback unit 17 and displayed on the rear monitor 18 through the OSD unit. Typically, the reproduced video image is displayed directly without any addition thereto. In addition, reproduced audio from the DVD playback unit 17 is supplied to the IR circuit 22 through the mixer 21. The audio is converted into spatial transmission signal using infrared light by the IR circuit 22. The fellow passenger in the rear seat is listening to the audio by use of the headphones 23 having a function to receive and demodulate the signal using infrared light. Accordingly, it is difficult for the fellow passenger to hear the outside sound directly. The reproduced audio is typically output directly without any addition thereto.

Incidentally, the video image displayed on the rear monitor 18 may be a television picture sent on the air. In addition, faint radio waves maybe used as a transmission method for the audio transmission to the head phones 23 in place of the infrared light. In this case, the head phones 23 have a function to receive the radio waves and a function to demodulate the radio waves.

Here, first, description will be made on presentation of vehicle information to the fellow passenger by audio when the driver operates the brake 12 to stop the vehicle. First, as soon as the brake 12 is operated, the brake operation is detected by a not-shown detector so that a brake signal is generated. This brake signal is introduced into the voice synthesis circuit 14 so that an audio signal corresponding to the brake signal, for example, a voice such as "going to slow down" is synthesized, output and supplied to the mixer 21. This voice synthesis is implemented easily by providing a conversion table or a voice generation program.

In addition, the audio information from the navigation unit 19 and the reproduced audio from the DVD playback unit 17 are also supplied to the mixer 21. Accordingly, the fellow passenger putting on the headphones 23 can know aurally that the vehicle will be braked to slow down soon, while listening to the reproduced audio of the DVD software. Thus, the fellow passenger can take a posture for the brake operation beforehand.

Next, description will be made on video information. When the brake 12 is operated, a brake signal is supplied to the OSD unit 15. In the OSD unit 15, an image corresponding to the brake signal is generated by the image generating portion 28. Under the control of the CPU 26, the generated image is synthesized with a signal from the DVD playback unit 17 or the video camera 16, supplied to the rear monitor 18 through the buffer memory 29, and displayed on the rear monitor 18. Accordingly, the fellow passenger can know visually that the vehicle will be braked to slow down soon, while watching the reproduced video image of the DVD playback unit 17. Thus, the fellow passenger can take a posture for the brake operation beforehand.

Incidentally, the image may be generated as follows. That is, images corresponding to input signals are formed in a table in advance. In response to an input signal, for example, a brake signal, an image corresponding to the brake signal is read. Alternatively, images may be made up by a program and output sequentially.

Next, description will be made on the case where the winker 13 is operated to carry out the operation of right turn or left turn. Also in this case, processing similar to that for the brake operation is carried out. First, as soon as the winker 13 is operated, a winker signal is generated. This winker signal may be extracted from a signal line for direction indication. Alternatively, a detection unit may be provided separately so as to obtain a detection signal.

The obtained winker signal is introduced into the voice synthesis circuit 14 so that an audio signal corresponding to the winker signal, for example, a voice such as "going to turn right" is synthesized, output and supplied to the mixer 21. This voice synthesis is implemented easily by providing a conversion table or a voice generation program in the same manner as that for the brake signal. Accordingly, the fellow passenger putting on the headphones 23 can know aurally that the vehicle will turn right soon, while listening to the reproduced audio of the DVD software. Thus, the fellow passenger can take a posture for the right-turn operation beforehand.

Next, description will be made on video information. When the winker 13 is operated, a winker signal is supplied to the OSD unit 15. An image corresponding to the winker signal is generated in the image generating portion 28 of the OSD unit 15. For example, the image is a rightward arrow or the like when the vehicle turns right. Under the control of the CPU 26, the generated image is synthesized with a signal from the DVD playback unit 17 or the video camera 16, and displayed on the rear monitor 18. Accordingly, the fellow passenger can know visually that the vehicle will turn right soon, while watching the reproduced video of the DVD playback unit 17. Thus, the fellow passenger can take a posture for the right-turn operation beforehand.

Further, the same rules can be also applied to the case where navigation information is supplied from the navigation unit 19. That is, when a driving route has been established, navigation information for right turn, left turn, diversion, and so on, is displayed on the monitor 20, that is, on the display 64 of the navigation unit 19, or output from the speaker 73 in an audio form before a point where real operation will be initiated. Thus, the driver is informed of the navigation information. When the navigation information is a voice, the voice is synthesized with the audio from the DVD playback unit 17 by the mixer 21, introduced into the IR circuit 22, modulated into infrared light, and sent to the headphones 23. Thus, the navigation information can be received, demodulated and listened to with the headphones 23.

On the other hand, to provide the navigation information as an image, the navigation information is supplied to the navigation information identifying portion of the OSD unit 15 so that the specific details of the navigation information are identified. An image corresponding to the navigation information is generated in the image generating portion 28 on the basis of the identified results, output to the rear monitor 18 through the CPU 26 and the buffer memory 29, and displayed on the rear monitor 18.

The fellow passenger in the rear seat can obtain anticipation about the vehicle running and take a posture therefor on the basis of the navigation information in the same manner as in the case of the brake signal or the winker signal.

The navigation unit 19, for example, establishes a driving route as follows. That is, the CD-ROM 53 or the DVD-ROM 54 is reproduced in the CD-ROM drive 51 or the DVD-ROM drive 52 respectively. A route is searched on the basis of map information read from the CD-ROM 53 or the DVD-ROM 54 so that a driving plan is designed. The driving plan is recorded in the hard drive unit 56 in advance. At the time of real driving, navigation information such as right turn, left turn, diversion, and so on, is supplied from this driving plan in accordance with the progress of driving. Thus, the navigation unit 19 has an important relation to the operation of the rear entertainment system 1 as described above. In addition, by use of the communication unit 58, information supplied from the outside may be output to the rear monitor 18 in accordance with necessity.

In addition, the audio information or the image information based on the brake signal, the winker signal or the navigation information can be turned ON/OFF through a control signal to the CPU 26 at the will of the fellow passenger.

Further, it is also possible to change the contents information, the audio information, the image information and the navigation information individually.

Next, the flow of the operation of the rear entertainment system 1 will be described with reference to the flow chart of FIG. 4. FIG. 4 shows the case where vehicle information is displayed as OSD on the rear monitor 18 in order to inform the fellow passenger in the rear seat of the state in which the vehicle will be operated soon, so as to make the fellow passenger conscious of the preparation and posture for the operation of the vehicle and ready therefor beforehand.

First, it is judged whether the right winker is operated to be turned ON or not (Step S101). Here, when the right winker is not ON, it is next judged whether the left winker is operated to be turned ON or not (Step S102). Here, when the left winker is not ON, it is next judged whether the brake is operated to be turned ON or not (Step S103). Here, when the brake is not ON, it is next judged whether the navigation information is ON or not (Step S104). Here, when the navigation information is not ON, the routine of processing returns to Step S101 again so as to check the right winker, the left winker, the brake and the navigation information and repeat anticipation of vehicle operation. Here, an ON signal of the brake is issued on the basis of the output from the detection unit for detecting the brake operation as described previously. In addition, the navigation information is information showing the route direction sent from the navigation unit. In addition, a signal of each of the right and left winkers may be diverged and extracted from a signal line for blinking a direction indicator when the winker is operated. Alternatively, a special detection unit may be provided.

When any one of the right winker, the left winker, the brake and the navigation information is ON, the routine of processing advances to Step S105. OSD for each signal is selected, and the selected OSD is displayed on the rear monitor (Step S106). Next, the contents displayed are confirmed (Step S107). When the contents displayed relate to the winker signal or the navigation information, it is judged in Step S108 whether the winker signal or the navigation information is still ON now or not. When the winker signal or the navigation information is ON, Step S108 is repeated to continue the display on the rear monitor. On the contrary, when it is concluded that the winker signal or the navigation information is no longer ON, the OSD is deleted so that the display is terminated (Step S109).

On the other hand, when it is concluded in Step S107 that the contents displayed designate a brake signal, it is judged in Step S110 whether the brake signal is still ON now or not. When the brake signal is no longer ON, the OSD is deleted so that the display is terminated (Step S111). On the contrary, when the brake signal is still ON, it is judged in Step S112 whether the ON time is within 10 seconds or not. When the ON time is within 10 seconds, the vehicle is regarded as being in braking operation, and the routine of processing returns to Step S110 so as to continue the display of the brake signal on the rear monitor. On the other hand, when the ON time has exceeded 10 seconds, the vehicle is regarded as having terminated the normal braking operation and being stopping. Thus, the OSD is deleted so that the display is terminated (Step S113). That is, when the vehicle is stopping, the driver keeps on stepping on the brake unless the driver uses the hand brake. It is therefore unnecessary to make a display of brake operation in this state.

Incidentally, although the time is set to be within 10 seconds in Step S112, this value is merely one example, and the time is not limited to the value. In addition, the value may be designed to be set desirably in accordance with the properties of the vehicle, the driver, and so on.

In addition, the order to detect the right winker, the left winker, the brake and the navigation information is not limited to the order described above. The detection may be carried out in any order.

Next, the flow of the operation in the case where a video image of a video camera is introduced into the rear entertainment system will be described with reference to the flow chart of FIG. 5. According to this operation, the video image from the video camera 16 taking a scene in the running direction of the vehicle is displayed on the rear monitor 18 in accordance with the operation of the vehicle. Further, information showing the operation of the vehicle is displayed in addition to the video image so as to make the fellow passenger in the rear seat be conscious of the preparation and posture for the operation of the vehicle and ready therefor beforehand.

First, it is judged whether the right winker is operated to be turned ON or not (Step S201). Here, when the right winker is not ON, it is next judged whether the left winker is operated to be turned ON or not (Step S202). Here, when the left winker is not ON, it is next judged whether the navigation information is ON or not (Step S203). Here, when the navigation information is not ON, the routine of processing returns to Step S201 again so as to check the right winker, the left winker and the navigation information again and repeat anticipation of vehicle operation.

When any one of the right winker, the left winker and the navigation information is ON, the routine of processing advances to Step S204, in which the video camera is made on standby. Next, the video image to be displayed on the rear monitor is switched to the video image from the video camera (Step S205), and it is judged in Step S206 whether the brake is ON or not.

When it is concluded in Step S206 that the brake is not ON, OSD for the winker signal or the navigation information is selected and displayed on the rear monitor (Step S207). Next, it is judged whether the winker signal or the navigation information is still ON now or not (Step S208). When the winker signal or the navigation information is ON, Step S208 is repeated to continue the display on the rear monitor. On the contrary, when it is concluded that the winker signal or the navigation information is no longer ON, the OSD is deleted so that the display is terminated (Step S209).

On the other hand, when it is concluded in Step S206 that the brake is ON, OSD for the brake is selected and displayed (Step S210) Next, in Step S211, it is judged whether the brake signal is still ON now or not. When the brake signal is no longer ON, the OSD is deleted so that the display is terminated (Step S212). On the contrary, when the brake signal is still ON, it is judged in Step S213 whether the ON time is within 10 seconds or not. When the ON time is within 10 seconds, the vehicle is regarded as being in braking operation, and the routine of processing returns to Step S211 so as to continue the display of the brake signal on the rear monitor. On the contrary, when the ON time has exceeded 10 seconds, the vehicle is regarded as having terminated the normal braking operation and being stopping. Thus, the OSD is deleted so that the display is terminated (Step S214).

Incidentally, although the time is set to be within 10 seconds in Step S213, this value is merely one example, and the time is not limited to this value. In addition, the value may be designed to be set desirably in accordance with the properties of the vehicle, the driver, and so on, in the same manner as one described with reference to FIG. 4.

Further, the order to detect the right winker, the left winker, and the navigation information is not limited to the order described above. The detection may be carried out in any order.

As has been described above, in the rear entertainment system according to the invention, the behavior of the vehicle taken with left turn, right turn, diversion, and so on, that the vehicle will carry out soon, stopping, starting or the like, is displayed on the rear monitor in advance so that the fellow passenger in the rear seat is informed of the behavior of the vehicle beforehand. Thus, the fellow passenger is prevented from discomfort. However, the rear entertainment system according to the invention is not limited to such a case. For example, information searched by navigation or road condition obtained through the communication unit may be displayed on a case-by-case basis so as to be also imparted to the fellow passenger.

Further, also when the vehicle starts moving again after stopping, the operation may be detected by a predetermined unit so as to be also displayed on the rear monitor and imparted to the fellow passenger in the rear seat. Other things concerning the behaviors of the vehicle that can be anticipated can be all introduced into the system flow.

Second Embodiment

Figure 6:
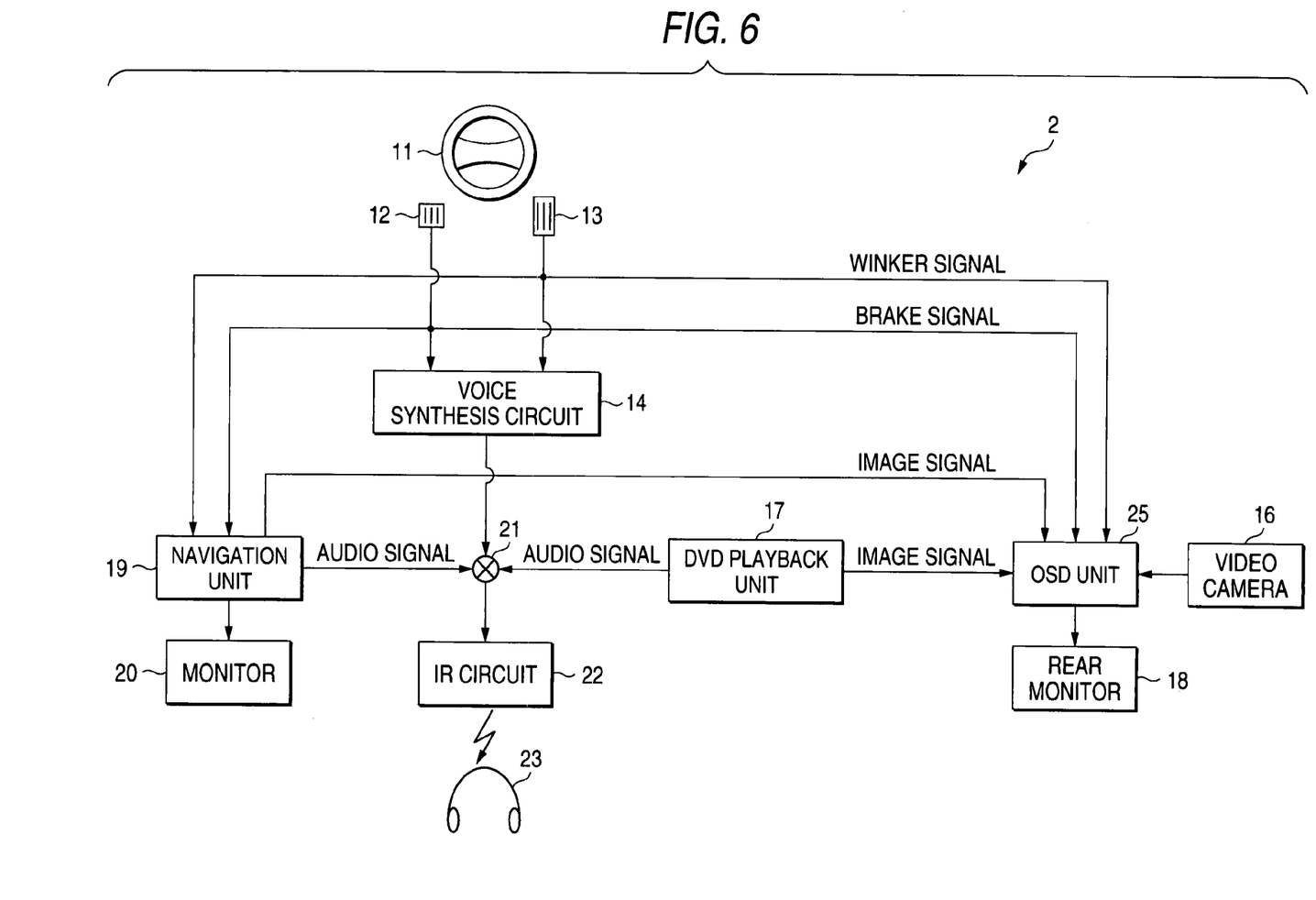
FIG. 6 is a block diagram showing the configuration of a rear entertainment system according to a second embodiment of the invention.
Figure 7:
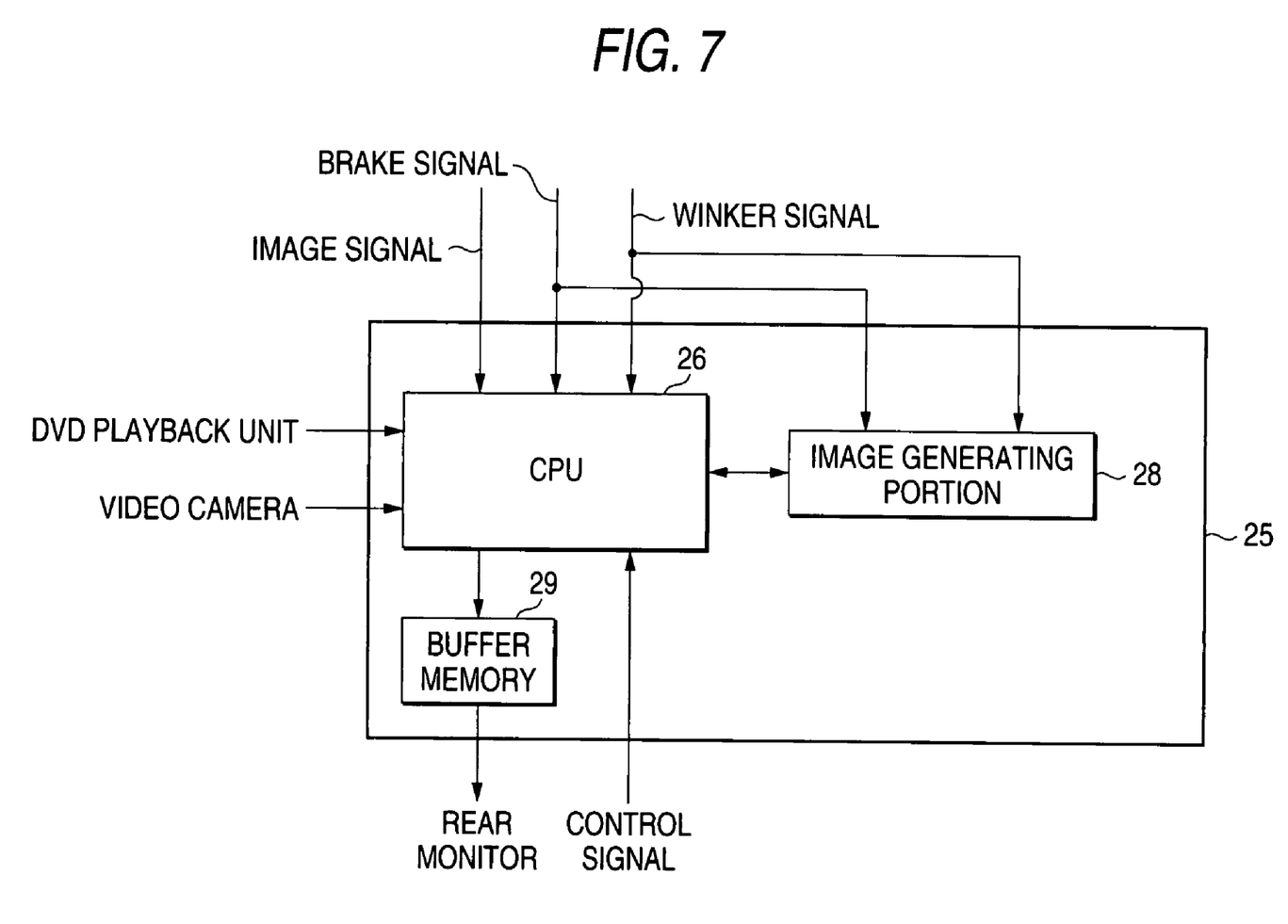
FIG. 7 is a block diagram showing the configuration of an OSD unit applied to the second embodiment.

Next, the second embodiment will be described with reference to FIGS. 6 and 7. Here, FIG. 6 is a block diagram showing the configuration of a rear entertainment system according to the second embodiment of the invention. FIG. 7 is a block diagram showing the configuration of an OSD unit applied to this embodiment.

According to this embodiment, an image associated with navigation information supplied from a navigation unit 19 is generated in the navigation unit 19 so as to be displayed on a rear monitor. Information presentation based on audio is similar to that in the first embodiment, and the flow of the system operation is also similar to that in the first embodiment. Thus, the description thereof will be omitted.

The configuration of a rear entertainment system 2 according to this embodiment is shown in FIG. 6. As shown in FIG. 6, the rear entertainment system 2 has a voice synthesis circuit 14, an OSD unit 25, a video camera 16, a DVD playback unit 17, a rear monitor 18, a navigation unit 19, a monitor 20, a mixer 21, an IR circuit 22, and headphones 23. The voice synthesis circuit 14 receives driving information from a handle 11, a brake 12, a winker 13 and so on which are constituent parts for driving the vehicle. The voice synthesis circuit 14 presents the driving condition in an audio form to a fellow passenger sitting in a rear seat. The OSD unit 25 presents the driving information from the handle 11, the brake 12, the winker 13 and so on, and the navigation information in a video form. The video camera 16 takes a scene in a forward direction. The DVD playback unit 17 reproduces DVD software. The rear monitor 18 is installed for the rear seat. The navigation unit 19 supports the driving of the vehicle. The monitor 20 is installed on the driver's seat side for displaying video signals from the navigation unit 19. The mixer 21 synthesizes the voice output of the voice synthesis circuit 14, audio signals from the DVD playback unit 17 and audio signals from the navigation unit 19. The IR circuit 22 converts the synthesized audio signals into IR signals. The headphones 23 receive the IR signals from the IR circuit 22 and convert the IR signals into audio.

The configuration of the OSD unit 25 is shown in FIG. 7. As shown in FIG. 7, the OSD unit 25 has a CPU 26, an image generating portion 28, and a buffer memory 29, by way of example. A brake signal, a winker signal, imaged navigation information, a photographic signal from the video camera 16, and a reproduced signal from the DVD playback unit 17 are supplied to the OSD unit 25, while a video signal is supplied from the OSD unit 25 to the rear monitor 18.

Next, the operation will be described. The navigation unit 19 has a function to output navigation information such as right turn or left turn as video signals. Accordingly, the OSD unit 25 does not need the navigation information identifying portion 27 in the first embodiment, and an image generating portion therefor. Information such as right turn or left turn supplied with the progression of driving in accordance with a driving plan can be displayed on the rear monitor 18 either directly from the video output of the navigation unit 19 by the OSD unit 25 or by synthesizing the video output with the video image from the DVD playback unit 17 or the video camera 16.

In addition, when the brake signal and the winker signal are supplied to the navigation unit 19, an image consistent with the brake signal and the winker signal is made up by a CPU 42 or the like of the navigation unit 19. Accordingly, on the basis of the operation of the brake 12 and the winker 13, an image corresponding thereto is output. Thus, although the OSD unit 25 supports the brake and the winkers, the image generating portion 28 can be also omitted.

The brake signal and the winker signal are supplied from an input unit 80 of the navigation unit 19, and introduced into the CPU 42 through a bus line 50 so that the sorts of the signals are discriminated. When images corresponding to the signals are formed by the CPU 42 in advance and stored in a hard disk unit 56, the system can be constituted easily. Not to say, the brake signal and the winker signal may be supplied to the OSD unit 25 so as to form an image as shown in FIG. 6.

In addition, the audio information or the image information based on the brake signal, the winker signal or the navigation information can be turned ON/OFF through a control signal to the CPU 26 at the will of the fellow passenger. This is, for example, implemented by an operating key provided in the headphones 23 so as to control the mixer 21 or the OSD unit 25 through a communication unit. Alternatively, any other suitable method may be used.

Also in the rear entertainment system 2 according to the second embodiment, the fellow passenger in the rear seat can know beforehand the behavior that the vehicle will take soon. Thus, the fellow passenger can take a posture for the behavior of the vehicle.

The invention is not limited to the embodiments. The invention can be modified appropriately without departing its spirit and idea that can be read from the accompanying claims and the specification as a whole. Any rear entertainment system and any control method thereof modified thus are also included in the technical idea of the invention.

As has been described above, according to the rear entertainment system and the control method thereof according to the invention, the condition in which the vehicle is going to run can be imparted also to the fellow passenger in the rear seat so as to ensure safety and reduce motion sickness. In addition, the driver and the fellow passenger in the rear seat can share information about the running environment of the vehicle even while playing contents information.

What is claimed is:

1. An entertainment system mounted on a vehicle for a passenger sitting in a rear seat of the vehicle, the system comprising:
   an output unit for outputting contents information including at least one of audio information and image information for the passenger sitting in the rear seat; and
   a first control unit for controlling the output unit in accordance with driving information indicating a driving condition which is a condition of an operating device used by a driver of the vehicle for driving so that the driving information is output directly or as audio or an image corresponding to the driving information in place of or in addition to the contents information, when the driving condition is in predetermined kinds of conditions.

2. The entertainment system according to claim 1, further comprising
a second control unit for controlling the output unit so that navigation information supplied from a navigation unit for carrying out navigation is output directly or as audio or an image corresponding to the navigation information in place of or in addition to the contents information.

3. The entertainment system according to claim 2, wherein the first control unit controls the output unit so as to convert at least one of the driving information and the navigation information into audio or an image corresponding thereto in accordance with a predetermined conversion rule and outputs the audio or the image in place of or in addition to the contents information.

4. The entertainment system according to claim 2, wherein at least one of the driving information and the navigation information includes synthetic voice information.

5. The entertainment system according to claim 2, wherein the contents information and at least one of the driving information and the navigation information are output from headphones.

6. The entertainment system according to claim 2, wherein another video image displaying at least one of the driving information and the navigation information is selectively displayed on one-half of a screen of the output unit.

7. The entertainment system according to claim 2, wherein another video image displaying at least one of the driving information and the navigation information is superimposed on a part of a screen of the output unit.

8. The entertainment system according to claim 2, wherein an output of at least one of the driving information and the navigation information can be turned ON/OFF.

9. The entertainment system according to claim 1, further comprising a unit for switching a screen of the output unit to a navigation screen.

10. The entertainment system according to claim 1, wherein a screen of the output unit is switched to a scenic video image through a camera taking an image of a scene outside the vehicle.

11. An entertainment system mounted on a vehicle, comprising:
an output unit for outputting contents information including at least one of audio information and image information; and
a first control unit for controlling the output unit in accordance with driving information indicating a driving condition of the vehicle so that the driving information is output directly or as audio or an image corresponding to the driving information in place of or in addition to the contents information, when the driving condition is in predetermined kinds of conditions,
wherein the driving condition includes at least one of a brake operating condition of the vehicle and a turn-signal blinking condition of the vehicle.

12. An entertainment system mounted on a vehicle, comprising:
an output unit for outputting contents information including at least one of audio information and image information; and
a first control unit for controlling the output unit in accordance with driving information indicating a driving condition of the vehicle so that the driving information is output directly or as audio or an image corresponding to the driving information in place of or in addition to the contents information, when the driving condition is in predetermined kinds of conditions,
wherein the driving information includes a tone of a turn-signal.

13. An entertainment system mounted on a vehicle, comprising:
an output unit for outputting contents information including at least one of audio information and image information;
a first control unit for controlling the output unit in accordance with driving information indicating a driving condition of the vehicle so that the driving information is output directly or as audio or an image corresponding to the driving information in place of or in addition to the contents information, when the driving condition is in predetermined kinds of conditions; and
a second control unit for controlling the output unit so that navigation information supplied from a navigation unit for carrying out navigation is output directly or as audio or an image corresponding to the navigation information in place of or in addition to the contents information,
wherein the contents information is paused, a screen of the output unit is switched to another screen displaying at least one of the driving information and the navigation information, and the screen is then switched again so as to be restored to the contents information.

14. A control method of an entertainment system mounted on a vehicle for a passenger sitting in a rear seat of the vehicle, the method comprising the steps of:
outputting contents information including at least one of audio information and image information for the passenger sitting in the rear seat; and
controlling the output step in accordance with driving information indicating a driving condition which is a condition of an operating device used by a driver of the vehicle for driving so that the driving information is output directly or as audio or an image corresponding to the driving information in place of or in addition to the contents information, when the driving condition is in predetermined kinds of conditions.

15. The control method according to claim 14, further comprising the steps of controlling the output step so that navigation information supplied from a navigation unit for carrying out navigation is output directly or as audio or an image corresponding to the navigation information in place of or in addition to the contents information.

* * * * *